US006944657B1

(12) United States Patent
Taghadoss

(10) Patent No.: US 6,944,657 B1
(45) Date of Patent: Sep. 13, 2005

(54) AUTOMATIC NETWORK SYNCHRONIZATION OF THE NETWORK CONFIGURATION WITH THE MANAGEMENT INFORMATION DATABASE

(75) Inventor: Mehdi Taghadoss, Cary, NC (US)

(73) Assignee: MCI Communications Corporation, Washington, DC (US)

( * ) Notice: Subject to any disclaimer, the term of this patent is extended or adjusted under 35 U.S.C. 154(b) by 954 days.

(21) Appl. No.: 08/934,513

(22) Filed: Sep. 22, 1997

(51) Int. Cl.[7] .......................................... G06F 15/173
(52) U.S. Cl. ..................................... 709/224; 709/223
(58) Field of Search ................................ 709/224, 226, 709/232, 243, 202, 201, 223, 238; 370/352, 259, 399, 401, 400, 254, 422, 455, 255; 707/103, 101, 100; 714/38

(56) References Cited

U.S. PATENT DOCUMENTS

| | | | |
|---|---|---|---|
| 4,937,825 A | 6/1990 | Ballard et al. ............. | 371/20.1 |
| 5,157,667 A | 10/1992 | Carusone, Jr. et al. ..... | 371/29.1 |
| 5,189,674 A | 2/1993 | Shimizu .................... | 370/20.1 |
| 5,233,600 A | 8/1993 | Pekarske ..................... | 370/14 |
| 5,299,201 A | 3/1994 | Carusone, Jr. et al. ........ | 371/51 |
| 5,412,652 A | 5/1995 | Lu ........................... | 370/85.12 |
| 5,436,909 A | 7/1995 | Dev et al. .................. | 371/20.1 |
| 5,452,306 A | 9/1995 | Turudic et al. .......... | 370/110.1 |
| 5,455,832 A | 10/1995 | Bowmaster ................ | 371/20.1 |
| 5,463,634 A | 10/1995 | Smith et al. ................ | 371/20.6 |
| 5,483,520 A | 1/1996 | Eychenne et al. ......... | 370/16.1 |
| 5,491,796 A * | 2/1996 | Wanderer et al. ...... | 395/200.09 |

(Continued)

OTHER PUBLICATIONS

Ref A: A multilayer–Architecture for SNMP–Based, Distributed and Hierarchical Management of Local Area Networks, Konopa R., Trommer M., IEEE publication No. 08–8186–718, dated Jul. 1995.*

Comer, Douglas; Internetworking with TCP/IP, Principals, protocols & architecture (pp. 453–457), 1995.*

Banerjee et al., "ISDN Primary Rate Access Maintenance", *IEEE*, 1989, pp. 2.6.1–2.6.5.

Cadieux et al., "A New Network Element for Performance Monitoring and Test Access Spanning the Digital Hierarchy", *IEEE*, 1990, pp. 324.4.1–334.4.5.

Kerschberg et al., "Intelligent Network Management: A Heterogeneous Knowledge Source Approach", *IEEE*, 1990, pp. 314–316.

Mageed et al., "Fault Detection and Identification Using a Hierarchical Neural Network–Based System", *IEEE*, 1993, pp. 338–343.

"Digital Networks: Architectures of Transport Networks Based on the Synchronous Digital Hierarchy (SDH)", *International Telecommunication Union*, Mar. 1993, pp. 1–57.

"Revised Draft Recommendation (M.3100), Generic Network Information Model", *International Telecommunication Union*, Jan. 17, 1997, pp. 1–87.

"General Aspects of Digital Transmission Systems; Terminal Equipments: Synchronous Digital Hierarchy (SDH) Mangement Information Model for the Network Element View", *International Telecommunication Union*, Sep. 1992, pp. 1–103.

*Primary Examiner*—Beatriz Prieto

(57) ABSTRACT

A system and method for establishing and maintaining a management information database is described. Upon power-up and self-discovery, a network element sends a management information notification message to the network management system identifying the managed network resources that are contained within the network element. The network management system uses the management information notification messages to update the management information database. The network management system can also subscribe to subsequent management information notification messages from the network element.

8 Claims, 9 Drawing Sheets

U.S. PATENT DOCUMENTS

| | | | |
|---|---|---|---|
| 5,566,162 A | 10/1996 | Gruber et al. | 370/13 |
| 5,608,720 A * | 3/1997 | Biegel et al. | 370/249 |
| 5,659,736 A * | 8/1997 | Hasegawa et al. | 395/611 |
| 5,737,518 A * | 4/1998 | Grover et al. | 714/38 |
| 5,774,669 A * | 6/1998 | George et al. | 395/200.54 |
| 5,805,801 A * | 9/1998 | Holloway et al. | 395/187.01 |

* cited by examiner

AUTOMATIC NETWORK SYNCHRONIZATION OF THE NETWORK CONFIGURATION WITH THE MANAGEMENT INFORMATION DATABASE

CROSS REFERENCE TO OTHER APPLICATIONS

The following application of common assignee contains some common disclosure and is incorporated herein by reference in its entirety:

U.S. Patent Application entitled "System and Method for Managing Network Resources Using Distributed Intelligence and State Management", application Ser. No. 08/813,724, filed Mar. 7, 1997, now U.S. Pat. No. 6,052,722 issued Apr. 18, 2000.

BACKGROUND OF THE INVENTION

1. Field of the Invention

The present invention relates generally to network management systems, and more specifically is directed toward the establishment and maintenance of a management information database using management information provided by network elements.

2. Related Art

One of the most fundamental challenges facing network management systems is the generation of an accurate representation of managed network elements for which the network management system is responsible. The managed network elements are represented by information that is stored in a management information database (MIB). The MIB represents the network management system's perception of the network. The MIB must be continually updated to reflect the dynamic network formed by the managed network elements.

A network can change dynamically due to changes in customer needs. For example, a customer's changing bandwidth requirements can alter the network at varying levels. Significant increases in bandwidth may alter the topology of a network as network elements are added to optimally accommodate the new customer requirements. At a smaller scale, changing customer needs may require the addition of channels on already existing network elements. In these scenarios, the internal configuration of a network element may be affected.

The dynamic changes within a network are based largely on the provisioning activities of the service provider. Provisioning is a general process of responding to a customer's needs in providing the requested amount of bandwidth service to the customer. For example, a customer may request that the service provider allocate 5 new DS3 channels between two of the customer's locations. These 5 new DS3 channels may be used to support digital data and video applications between the customer's two locations. Depending upon the customer's needs, these new bandwidth services may also require a given service reliability level (e.g., 99.98% availability, less than X severely errored seconds, etc.).

After the customer has identified the bandwidth and associated reliability requirements, the service provider can then identify the physical layout for each of the new channels that are to be provisioned. In this process, the network engineer may consider whether single points of failure should be avoided, what type of protection scheme should be used, etc. After the network engineer has identified a routing for each of the channels, a work order is generated. This work order is used to direct the service provider's service personnel in physically setting up the channel between the customer's locations. The channel setup process requires the physical installation of new circuit packs (e.g., interface cards, multiplexing cards, etc.) within a plurality of managed network elements. Generally, the new circuit packs can be associated with a working channel or a redundant channel for a given protection scheme.

After the channel setup is complete, the MIB must be updated to accurately reflect the changes in the network. The updating process can be labor intensive. Human operators are predominantly awarded the task of entering the information representing the newly provisioned channels into the MIB. This entry process is prone to mistake. The human operator may unintentionally enter erroneous information. For example, the human operator may simply mis-type some of the vital information. Digits that are erroneously entered may represent port numbers, the number of shelves in a network element, etc.

Mistakes in the data entry process will lead to the creation of an inaccurate MIB. The inaccurate MIB, in turn, will cause the network management system to have an inaccurate view of the managed network elements within the network. This inaccurate view severely compromises the ability of the service provider to manage the network.

For example, to perform a restoration switch, accurate information is needed to ensure that the correct channels are actually switched. Inadvertent switching of the wrong channels to the protection channel may compound the problem that is sought to be solved. Errors of this magnitude will severely impact the confidence of the customer in the ability of the service provider to effectively handle its bandwidth requirements.

Further with respect to a service provider's customers, an accurate view of the network is necessary to ensure that the customer is kept informed of the status of its bandwidth services. The network management system is designed to respond to customer service requests or be proactive in addressing future network problems. Without an accurate view of the network, the service provider may be prevented from responding to a customer's request in a timely manner.

SUMMARY OF THE INVENTION

The present invention provides a comprehensive network management system that can efficiently and accurately generate and maintain a management information database (MIB). In this process, the network configuration is automatically synchronized with the MIB. The MIB represents the network management system's view of the managed network resources.

The network management system is responsible for a plurality of network elements. Each of the network elements can include a plurality of network resources. One example of a managed network resource is the physical hardware contained within a single network element. Other examples of network resources include the logical termination points associated with end-to-end paths.

Upon power-up and self-discovery, a network element sends a management information notification message to the network management system. The management information notification message identifies a network resource that is contained within the network element. Upon receipt, the network management system determines whether the network element is a new network element. If so, the network management system instantiates an entity and associates the entity with the network resource identified by the management information notification message. Generally, an entity includes a unit of information that describes a network resource.

After the management information database is updated, the network management system registers with the network element for receipt of subsequent management information notification messages. This registration process allows the network management system to receive only a subset of management information notification messages that are generated by changes in network resources contained within the network element. These subsequent management information notification messages permit the management information database to be maintained.

It is a feature and advantage of the present invention that the MIB can be accurately and efficiently established and maintained. Updates to the MIB are processed automatically without the intervention of human operators that are prone to unintentional mistakes. This enables the network management system to rely on a MIB that accurately reflects the current configuration of the dynamic network.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The operation and administration of a service provider's network is becoming increasingly complex. Network elements continue to evolve in support of the provision of a wider range of services. The overriding goal of network management is to ensure that all aspects of the network are operating according to both the service provider's design and the customer's expectations.

An example of a network management system is the system based on the International Telecommunications Union (ITU)—Telecommunications Management Network (TMN) standard. The ITU-TMN standard is an open-ended framework designed for a service provider to implement its own network management process.

In this example standard, the network management system includes a network element layer (NEL), an element management layer (EML), a network management layer (NML), a service management layer (SML), and a business management layer (BML). In this framework, managed network elements (NEs) represent a physical layer of the network represented by the NEL. Each of managed NEs can be designed to provide alarm and performance information to an element manager in the EML. Managers in the EML forward alarm and performance information to managers in the NML. In one example, the managers in the NML can be defined on a national level while managers in the EML can be defined on a local level.

In the SML, applications can be defined for provisioning, accounting/billing, security, network performance, fault management, etc. Finally, the BML represents the general corporate policy that dictates the general business and contractual arrangements of the service provider.

Figure 2:
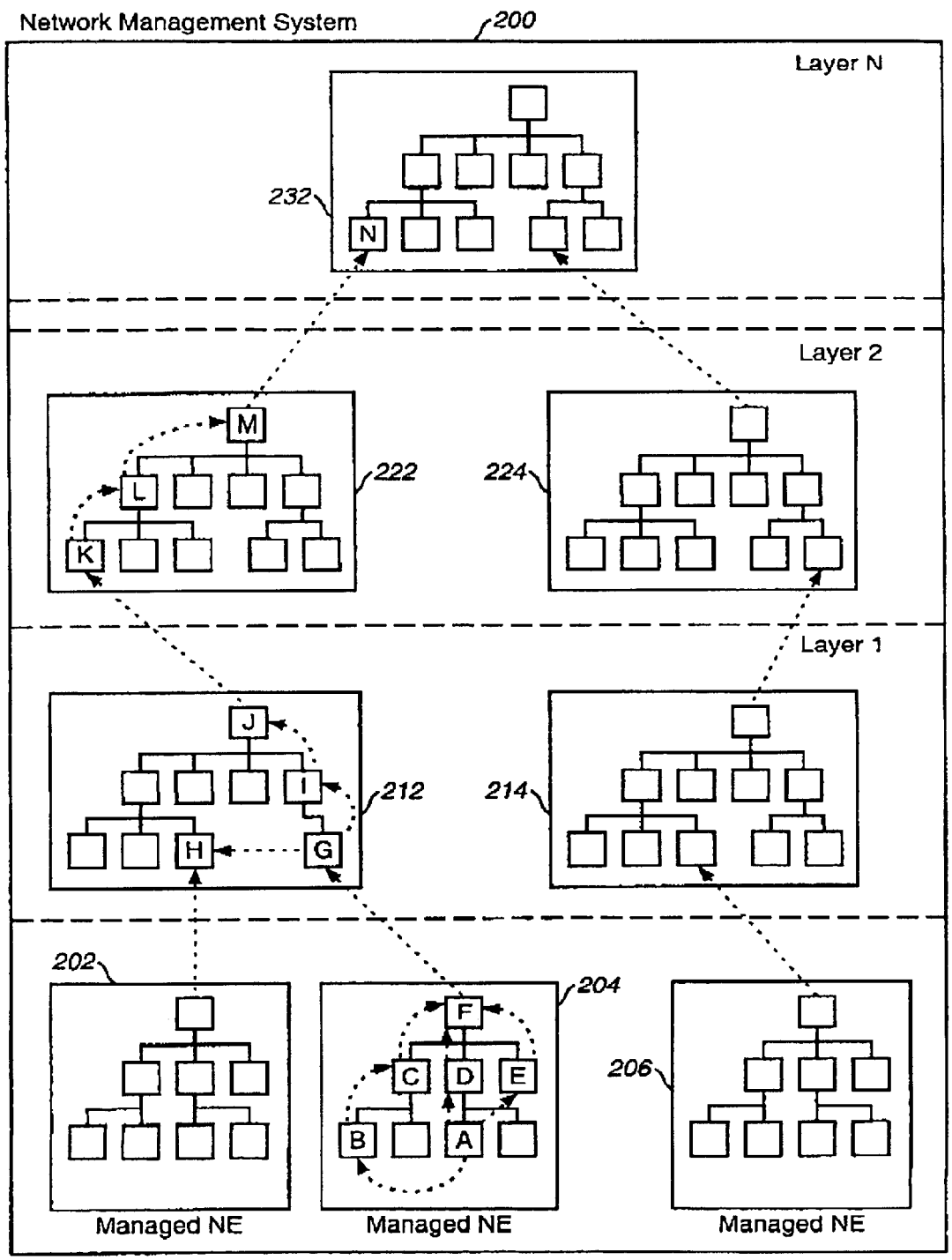
FIG. 2 illustrates a network management system according to one embodiment of the present invention.

FIG. 2 illustrates an example implementation of a layered network management system. The lowest level of network management system 200 includes managed NEs 202, 204, 206. The next highest layer, layer 1, includes managers 212 and 214. The domain of managers 212 and 214 can represent geographical portions of a network. As illustrated in FIG. 2, managed NEs 202 and 204 are within the domain of manager 212. Similarly, managed NE 206 is within the domain of manager 214. Proceeding to the next highest layer in network management system 200, managers 222 and 224 can represent domains on a national network level. Note that the number of levels in a network management system can be defined based upon a given application. At a highest level, layer N, manager 232 can be assigned to service and customer level interests.

As further noted in FIG. 2, each NE or manager includes a plurality of objects. Generally, an object represents a real-world managed network resource. Object class specifications define detailed characteristics which instances of that class may exhibit through behavior definitions, attributes, actions and notifications. Behavior definitions are textual descriptions which describe how the object behaves and reacts and possibly how it is related to other objects. Attribute values represent data associated with the object or relationships with other objects. Actions are operations that may be performed on object instances within the system. Finally, notifications are messages sent to inform the system of events and actions which have affected the particular instance involved. As with any object-oriented system, the concepts of encapsulation and data abstraction or inheritance are used. Inheritance, or the sharing of characteristics such as data and methods are based on a hierarchial relationship.

Each object can represent a particular managed network resource. One example of a managed network resource is a circuit pack contained within a NE. A second example of a managed network resource is a logical termination point for a particular level of multiplexed traffic. In one application, a set of object definitions has been defined in the context of telecommunications. ITU-T recommendation G.803, Architectures of Transport Network Based on the Synchronous Digital Hierarchy (SDH), ITU-T recommendation M.3 100 Generic Network Information Model, and ITU-T recommendation G.774, Synchronous Digital Hierarchy (SDH) Management Information Model for the Network Element View, describe a general framework for object definitions in a telecommunications environment.

It should be noted that the SDH telecommunications network application described herein represents one embodiment of the present invention. The present invention can also be applied to non-SDH telecommunications network. More generally, the present invention is extendable to other sets of object definitions that can be defined in any other network management environment.

Figure 3:
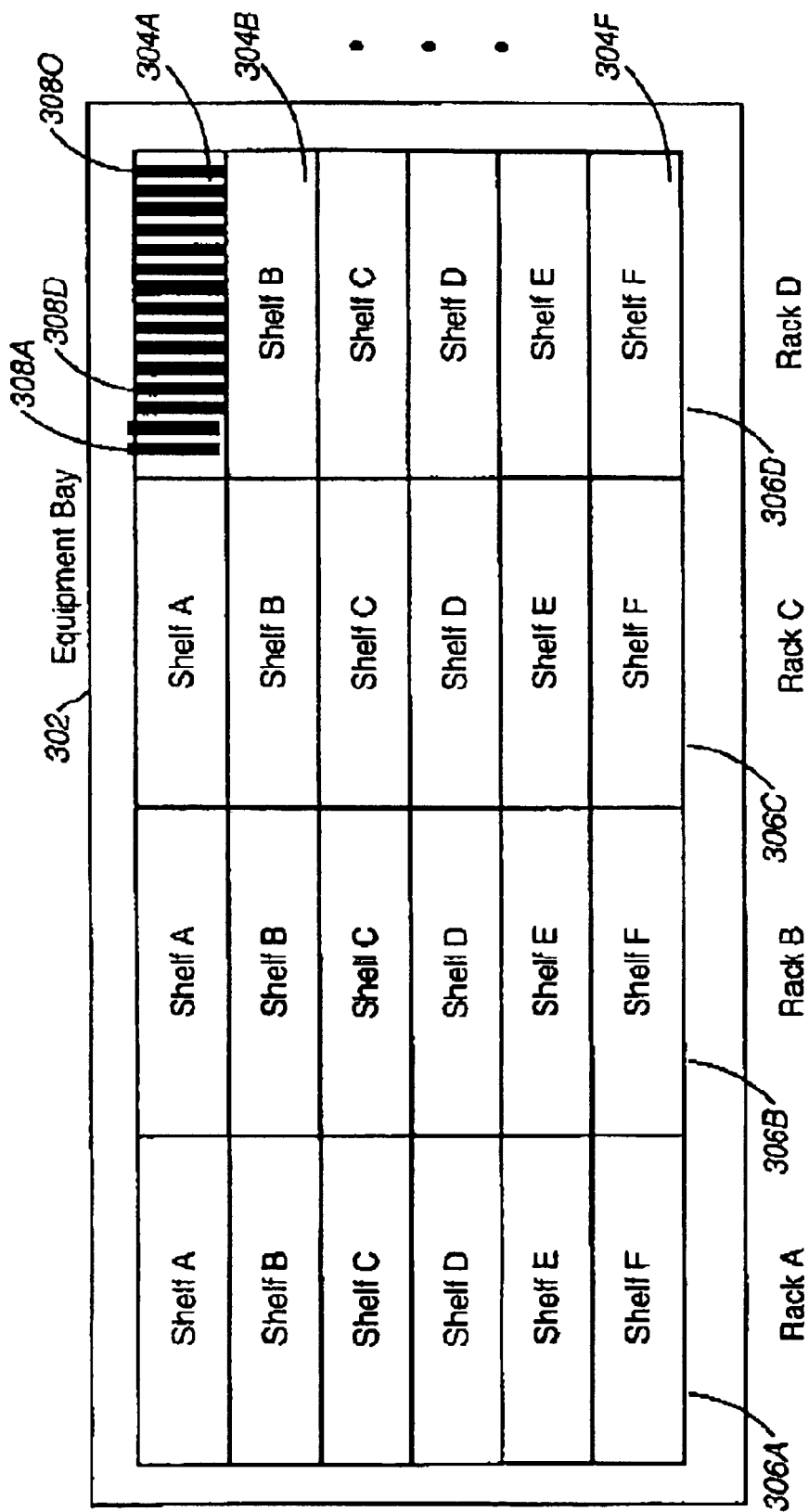
FIG. 3 illustrates an example configuration of the physical layout of a network element.

Examples of types of object associations are now provided. One type of object association is exemplified by a hardware containment relationship. Prior to describing a hardware containment relationship, reference is first made to FIG. 3 where an illustration of an exemplary physical layout of a network element is described. As shown in FIG. 3, an example of a network element is an equipment bay. Equipment bay 302 can be organized as a plurality of side-by-side racks 306A–306D, each having a plurality of top-to-bottom shelves 304A–304F, wherein each shelf contains a plurality of vertically mounted slots 308A–308O. Circuit packs are installed in vertically mounted slots 308A–308O.

Figure 4:
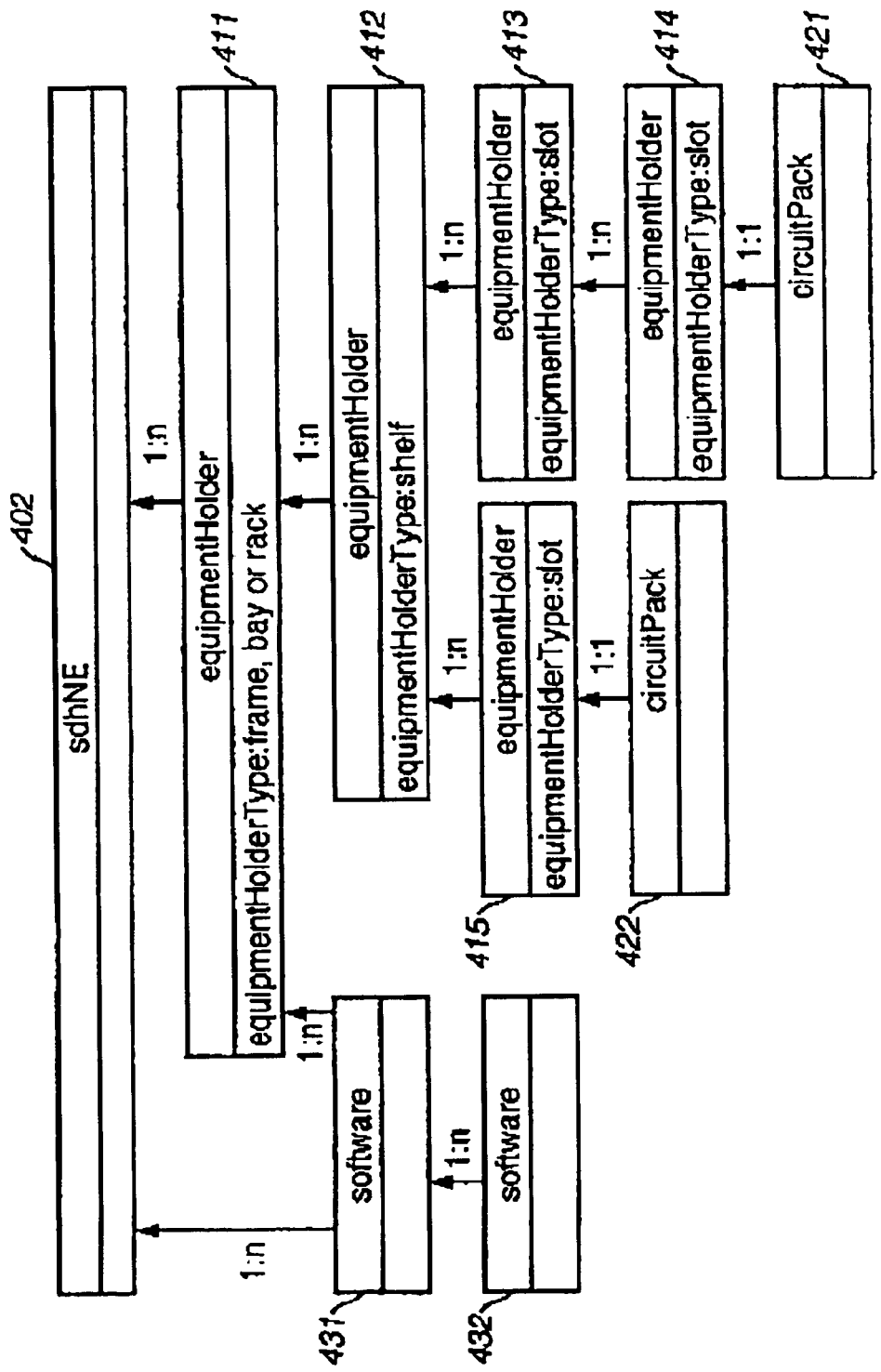
FIG. 4 illustrates a hierarchy of objects that correspond to the physical network resources of a network element.

FIG. 4 illustrates one example of a hierarchial structure of objects representing the hardware containment relationship. At the highest level, sdhNE object 402 represents the entire network element itself. With reference to the example illustration of FIG. 3, sdhNE object 402 can represent equipment bay 302 assuming that only one equipment bay exists. Contained within equipment bay 302 is a plurality of racks 306A–306D. Each of racks 306A–306D can be represented by an equipment holder object 411.

Generally, an equipment holder object can be used to represent any level of a network element's physical hierarchial structure. Each rack further includes a plurality of shelves A–F. Each shelf A–F can also be represented by an equipment holder object 412. Equipment holder object 411 is distinguished from equipment holder object 412 by the attribute equipment holder type. Within each shelf A–F, there is included a plurality of slots 308A–308O. A single slot or a subset of slots can be represented by another equipment holder object 413–415.

Continuing down the equipment hierarchy, a circuit pack object 421, 422 is used to represent a specific piece of hardware (i.e., circuit pack) that resides in a particular slot 308A–308O. Examples of different types of circuit packs include optical/electrical (O/E) converters, mappers/multiplexers, interface cards (e.g., DS3), and power modules. As would be apparent to one of ordinary skill in the relevant art, an arbitrary numbers of levels within an equipment hierarchy can be used to represent an arbitrary piece of hardware.

As further illustrated in FIG. 4, software objects 431,432 can also be used to represent pieces of network software. The relations between the individual pieces of software in the network element, can be used to define the specific hierarchy of software objects 431, 432.

In addition to the hardware containment described in the relationships above, a generic form of association relationship can be used to define a hierarchy of objects representing managed network resources. Managed network resources include more than simply pieces of hardware. Managed network resources can also include the logical "pipes" that carry customer circuits. These logical pipes can be defined at any signal level in the multiplex hierarchy.

Further associated with each logical pipe are termination points (i.e., ends of the logical pipe). Termination points reside in the network element that terminates a logical pipe (or connection). In this framework, an association relationship can also be used to relate a plurality of termination points. More generally, an association relationship can be used to specify a relation between a customer and the customer's circuits.

Figure 5:
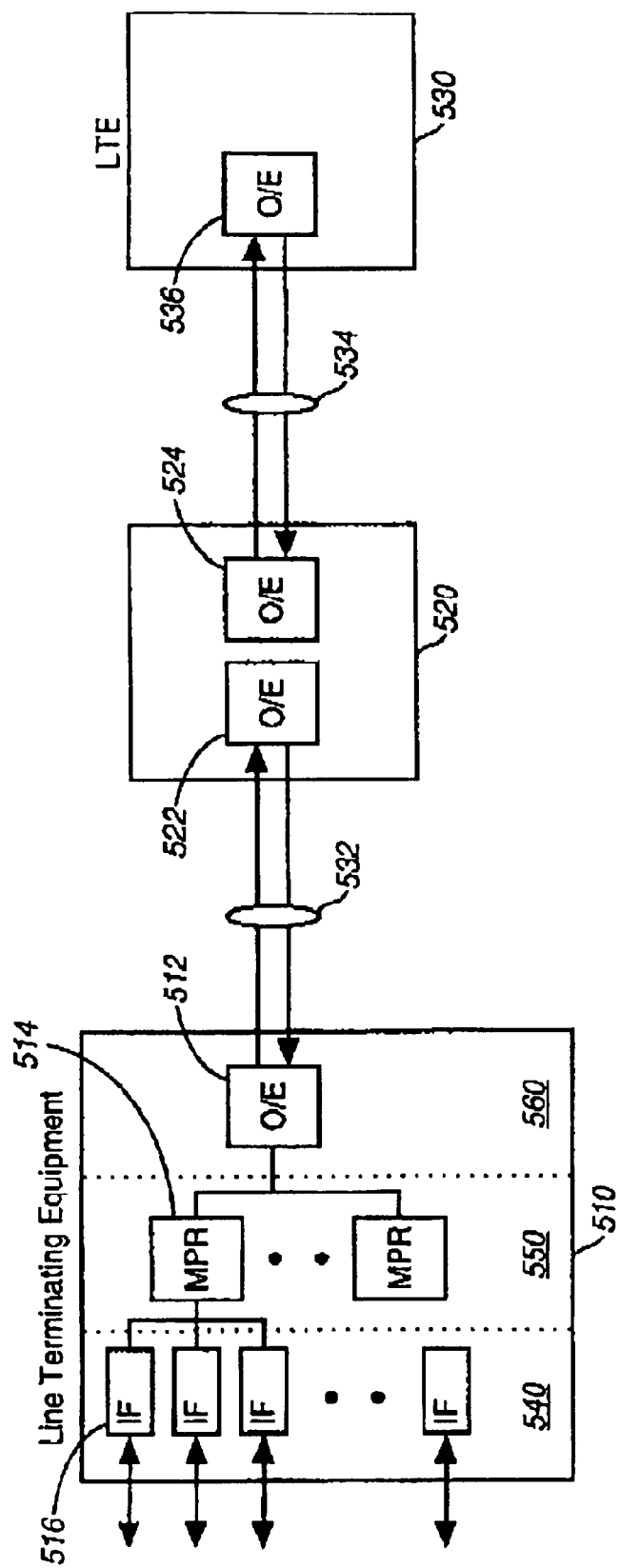
FIG. 5 illustrates an exemplary long-haul fiber-optic connection between two pieces of line terminating equipment.

FIG. 5 illustrates an example of a long-haul connection between line terminal equipment (LTE) 510 and 530 that is used to carry a plurality of customer circuits. For illustration purposes, LTE 510 is presented in the form of a high-level functional block diagram. This high level block diagram includes three separate sections 540, 550, 560. Section 540 provides an interface function and includes interface cards (IF) 516. Section 550 provides a mapping/multiplexing function as lower-rate electrical signals are combined into a higher rate signal (e.g., STS-48) for transport onto fiber optic link 532. Section 550 includes mappers (MPR) 514. Section 560 provides an optical interface function and includes optical/electrical (O/E) unit 512.

In an example configuration, a digital signal (e.g., DS3) is first received by IF 516. This digital signal is then provided to one of MPR units 514. Generally, MPR 514 converts the digital signal into a SONET/SDH format and/or multiplexes the digital signal into a higher rate digital signal. In one example, a DS3 signal received by IF 516 is transformed into an STS-1 signal in the SONET hierarchy. A plurality of STS-1s can be received by MPR 514 and converted into a higher rate SONET signal (e.g., STS-12). Various stages of multiplexing can be used, but the end result is a high-rate electrical signal being provided to O/E 512 that interfaces fiber optic cable 532. O/E 512 converts the high-rate electrical signal into an optical signal and transmits it on a fiber optic cable within link 532.

Link 532 represents a general bi-directional link between LTE 510 and regenerator 520. Regenerator 520 reconditions an optical signal that is degraded due to its transmission over a long span of fiber optic cable (e.g., 25–30 miles).

More specifically, after a signal is received by O/E 522 in regenerator 520, the signal is reconditioned and provided to O/E 524. O/E 524 transmits the optical signal to LTE 530 using link 534. The logical link between LTE 510 and regenerator 520 defines a regenerator section. The logical link between regenerator 520 and LTE 530 defines a second regenerator section. A regenerator section represents a part of the transport protocol where the section overhead is terminated.

The section overhead is used to monitor the status and integrity of communication between LTE 510 and regenerator 520 or regenerator 520 and LTE 530. Similarly, the link between LTE 510 and LTE 530 defines a modulated section. This modulated section represents a portion of the transport protocol where the line overhead is terminated. The line overhead is used to monitor the status and integrity of communication between LTE 510 and LTE 530.

Having described a generic example long-haul connection, an example association relationship between termination points is now described with reference to FIG. 6. Generally, a termination point is the end of a logical link. The logical link can represent a digital signal at any of a plurality of signal levels. For example, consider the different types of termination points that can exist within LTE 510. First, there exists a physical termination point at the interface between O/E unit 512 and fiber optic cable 532. Next, there is a termination point of the logical link that exists between LTE 510 and regenerator 520. As noted above, this link represents a regenerator section. In terms of the transport protocol, this termination point is defined by the removal and processing of the section overhead in the SONET/SDH frame.

Continuing in LTE 510, the next termination point is for the logical link between LTE 510 and LTE 530. This logical link represents a modulated section. In terms of the transport protocol, this termination point is defined by the removal and processing of the line overhead in the SONET/SDH frame.

At this point, is should be noted that each of the termination points thus described are for logical links that are operating at the line rate (e.g., OC-48) carried on fiber optic cables 532 and 534. Multiplexed within this OC-N signal are a plurality of lower rate signals. Each of these lower rate signals define a separate logical link and therefore have their own separate termination points. The relation between these termination points provides a type of containment association corresponding to a signal flow relationship.

Figure 6:
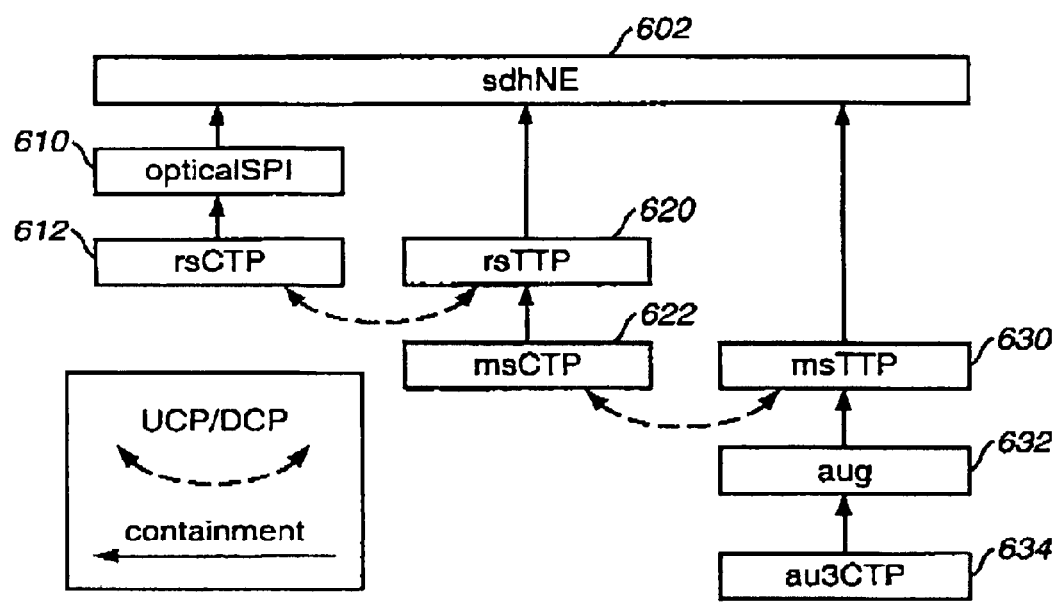
FIG. 6 illustrates a general termination point containment and signal flow relationship within a network element.

As FIG. 6 illustrates, the highest level object is sdhNE object 602. Object 602 (analogous to object F in FIG. 2) identifies the entire managed network resource represented by a managed NE 202, 204, 206. Contained within object 602 is optical SPI object 610. Object 610 corresponds to the termination point represented by the physical endpoint of fiber 532. As noted above, the physical endpoint is represented by the interface between link 532 and O/E 512. Contained within optical SPI object 610 is regenerator section connection termination point (rsCTP) object 612. Object 612 represents the point at which the regenerator section connection is terminated.

Also contained within sdhNE object 602, is regenerator section trail termination point (rsTTP) object 620. Object 620 represents the termination point of the regenerator section, or the point at which the regenerator section overhead is processed and removed. Contained within rsTTP object 620 is modulated section connection termination point (msCTP) object 622. Object 622 represents the point at which the modulated section connection is terminated. Object 620 and object 622 represent an example of a trail/connection association relationship. Generally, the trail represents a server entity for one or more connections that may be concatenated in sequence to form the trail sequence and/or bundled to form a higher-rate trail entity. The trail/connection relationship is described more fully in ITU-T recommendation G.774.

Figure 7:
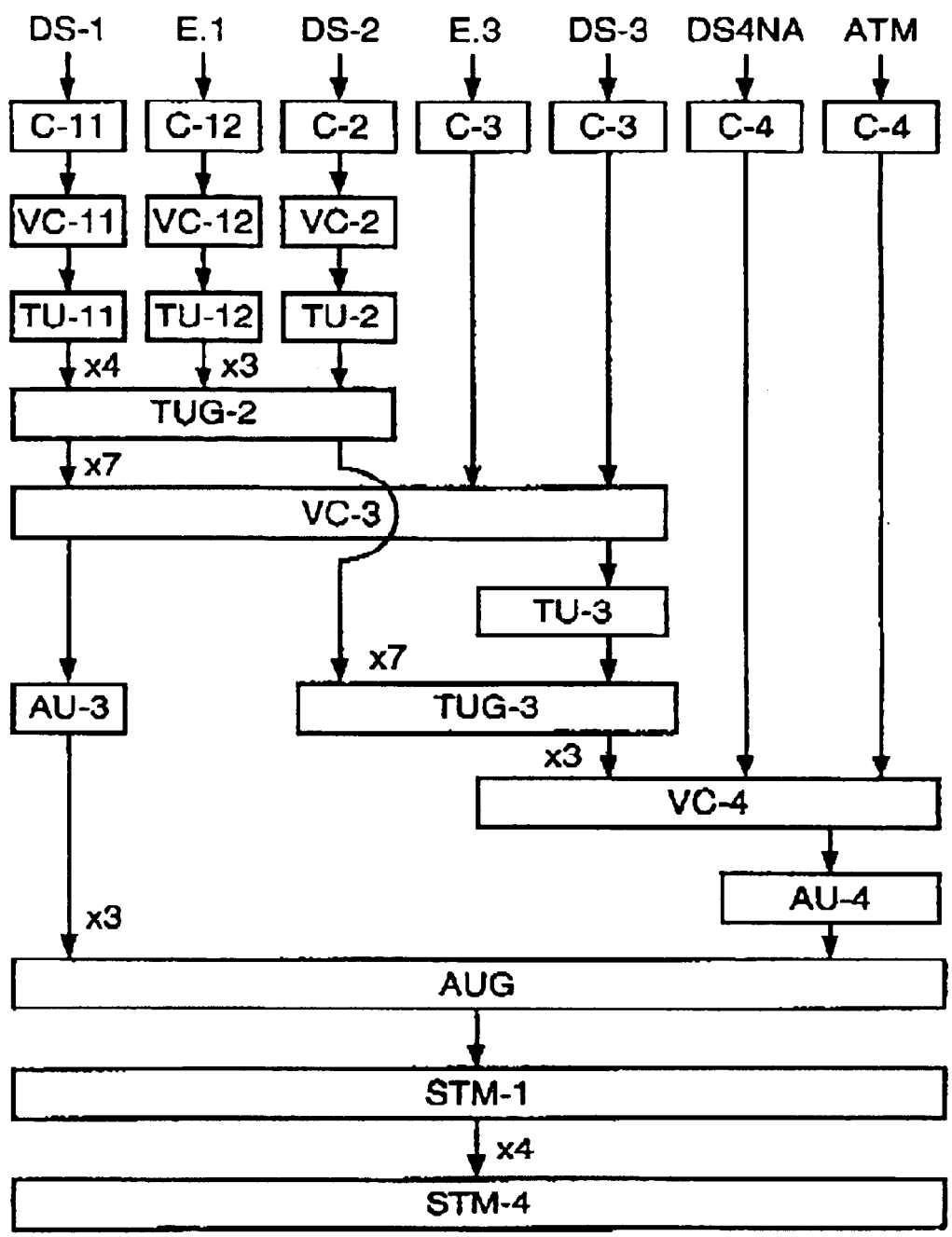
FIG. 7 illustrates a multiplex hierarchy in the synchronous digital hierarchy.

Further contained within sdhNE object 602 is modulated section trail termination point (msTTP) object 630. Object 630 represents the termination point where the line overhead is processed and removed. Contained within msTTP object 630 is aug object 632. Object 632 represents a specific sub-level in the SDH multiplex hierarchy (See FIG. 7). Similarly, au3CTP object 634 represents a further sub-level in the SDH multiplex hierarchy. The objects contained within msTTP object are dependent upon the specific multiplex configuration that is implemented. The possible levels and relationships within the SDH multiplex hierarchy are illustrated in FIG. 7.

In combination, the objects in FIG. 6 represent a general termination point containment and signal flow relationships within an exemplary network element. As described above, these objects represent multiple levels within the multiplexed hierarchy.

These example association relationships between objects can be used to define an object hierarchy. FIG. 2 illustrates a generic object hierarchy for the layered network management system 200. Each layer includes its own object hierarchy. As described in copending U.S. Patent Application entitled "System and Method for Managing Network Resources Using Distributed Intelligence and State Management," each of the individual objects has an associated state value. State changes are propagated between the individual objects through state change notifications. Upon receipt of a state change notification, an object determines whether its own state is affected. In this manner the network management system can efficiently and accurately identify the state of physical and logical managed network resources.

As noted, network management system 200 includes a plurality of layers. Each layer includes its own object hierarchy. In a preferred embodiment, layers I through N are distinct from the network element layer. The network element layer includes the managed NE. The managed NEs can include their own generic object hierarchy that defines the various association relationships between the physical and logical managed network resources contained within the NE.

To manage these physical and logical network resources, the network management system must have an accurate view of those resources. The network management system of the present invention includes a mechanism for populating a management information database (MIB) with the information contained within the objects of the managed NEs.

Figure 8:
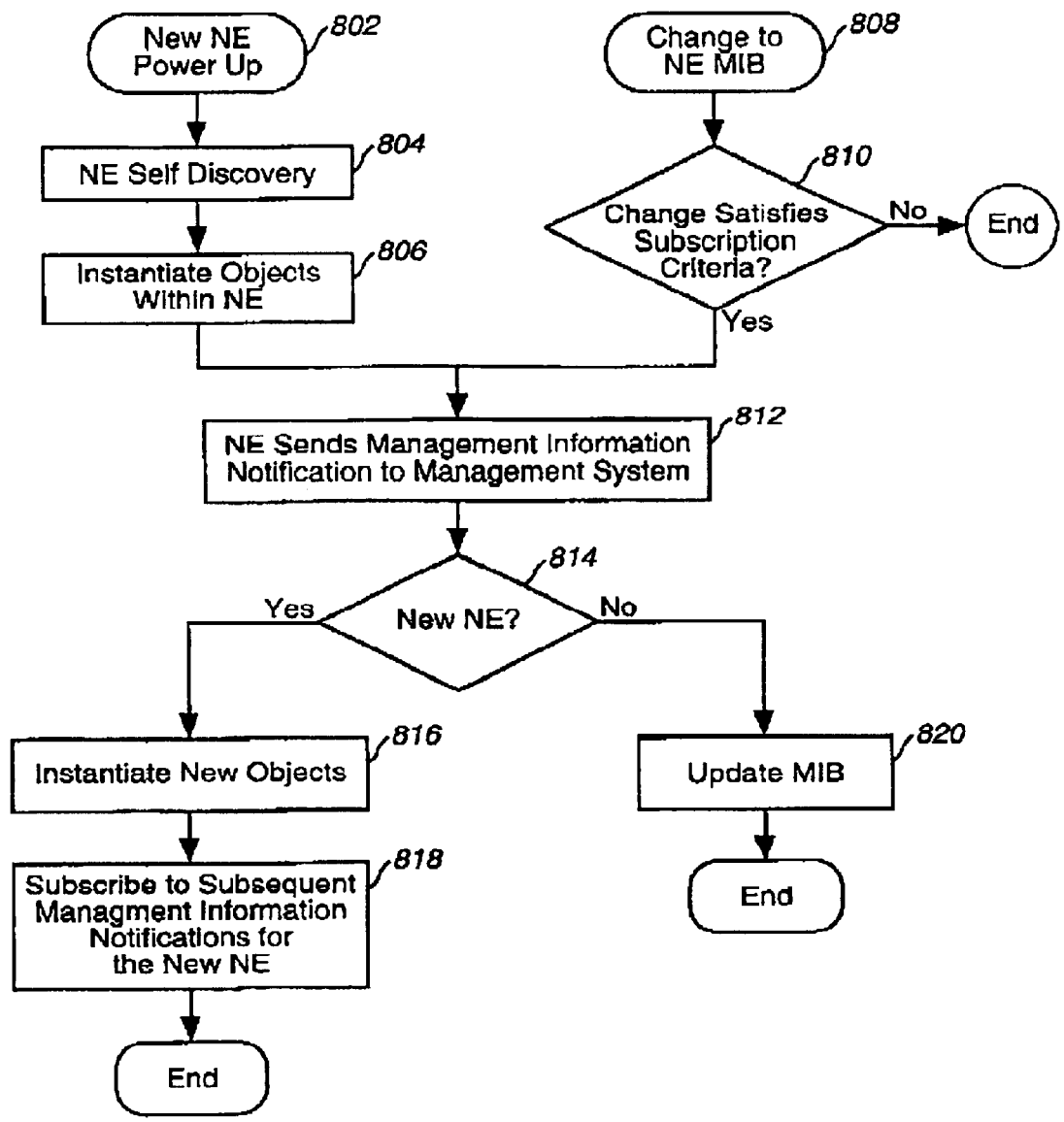
FIGS. 8 and 9 illustrate flowcharts of the updating of the management information database.

FIG. 8 illustrates a flowchart of the processes of populating and updating a MIB. These illustrated processes are initiated by the managed NE in two scenarios: (1) upon the power up of the managed NE, and (2) upon a change in the managed NE.

Consider first the scenario of the power up of a managed NE. This scenario is illustrated by step 802. After a NE is powered up, the NE proceeds through a self discovery process in step 804. Self-discovery by the NE is generally focused on the identification of the configuration of the NE. Referring back to FIG. 3, the NE identifies the population of slots within the various shelve and racks that comprise the NE. The identification of the circuit packs, shelves and racks enable the NE to generate a physical containment hierarchy similar to the hierarchy illustrated in FIG. 4.

In addition to these hardware containment relationships, the NE also identifies other association relationships such as the termination point containment and signal flow relationships. Termination point containment and: signal flow relationships were described above with reference to FIGS. 5 and 6 The multiplex hierarchy that defines the termination point containment and signal flow relationships can be identified based upon the identification of the various circuit packs that populate the slots of the shelves.

More specifically, the NE can identify a multiplex hierarchy based upon the character of the interface and multiplexing circuit packs that are included within the NE. For example, the NE may receive DS3, OC-12, etc. signals. Each of these input signals require a specific interface circuit pack. The identification of these circuit packs enable the NE to identify the stages of multiplexing within the NE that are performed prior to the output of a high-rate optical signal (e.g., OC-48).

Upon identification of the various association relationships such as the physical containment relationships and the termination point containment and signal flow relationships, the NE proceeds to instantiate objects for the managed network resources. This instantiation process is illustrated by step 804. The instantiated objects are organized in a hierarchy defined by the association relationships. A generic object hierarchy within a managed NE is illustrated by NEs 202, 204, 206 in FIG. 2.

After the object hierarchy is generated within the NE, the NE proceeds, in step 812, to send a management information notification message to the network management system. This management information notification message identifies the configuration of the NE.

In one embodiment, the objects within the NE can individually send its own management information notification message identifying the managed network resource that it represents. In other embodiments, the management information notification messages are sent by an agent within the NE. This agent is a part of a manager/agent relation that can exist between the network management system and the NE. Both the manager and agent are pieces of software that contain a plurality of objects. Note, however, that the agent generally is not required to include a plurality of objects. Rather, the agent can generally simulate the existence of objects.

Upon receipt of the management information notification message(s), the network management system determines whether the NE is a new NE. This determination step is illustrated by step 814. If the NE is new, the network management system proceeds to instantiate new objects representing the managed network resources that are contained within the new NE. This process is illustrated as step 816.

Next, in step 818, the network management system subscribes to subsequent management information notifications for the new NE. This subscription process enables the network management system to receive only a defined set of management information notification messages. In this manner, the network management system can selectively update the MIB as necessary.

For example, a subscription can be effected such that a NE will not send management information notification messages that are associated with maintenance actions. Maintenance actions can affect the state of managed network resources. To eliminate unnecessary updates of the MIB, the subscription can be designed such that the NE will only send a management information notification message where there is a creation or deletion of a network resource within the managed NE. For example, the NE may be instructed to send a management information notification message to the network management system when a circuit pack is replaced not when the circuit pack is pulled for repair.

Generally, the subscription process can be defined with arbitrary granularity. Management information notification messages can be required for permanent changes in the network, temporary changes that will be in effect for a given period of time, etc. Subscriptions can also be variably defined based upon the relationship of the network resources to a particular customer. This would enable the service provider to give a particular customer an accurate view of the network resources that are associated with their bandwidth services. Generally, the subscription can be defined for all or part of the network resources that are contained within the NE.

As noted above, the NE can also send management information notifications to the network management system upon a change to a network resource that is contained within the NE. This scenario is represented by step 808. Upon a change to the NE MIB, the NE then determines, in step 810, whether the change satisfies the previously registered subscription criteria. These subscription criteria were defined based upon the initial transaction that occurred after power-up of the NE.

If the change does not satisfy the subscription criteria, the process ends. No management information notification message is sent. If the change does satisfy the subscription criteria, then the NEs sends the management information notification message to the network management system. This process is represented by step 812. Thereafter, in step 814, the network management system determines whether the management information notification message is sent from a new NE. In this case, since the NE is not a new NE, the network management system is not required to subscribe to subsequent management information notification messages. Thus, only the network management system MIB is updated in step 820. In this update process, new objects may have to be instantiated to represent newly created network resources.

Figure 9:
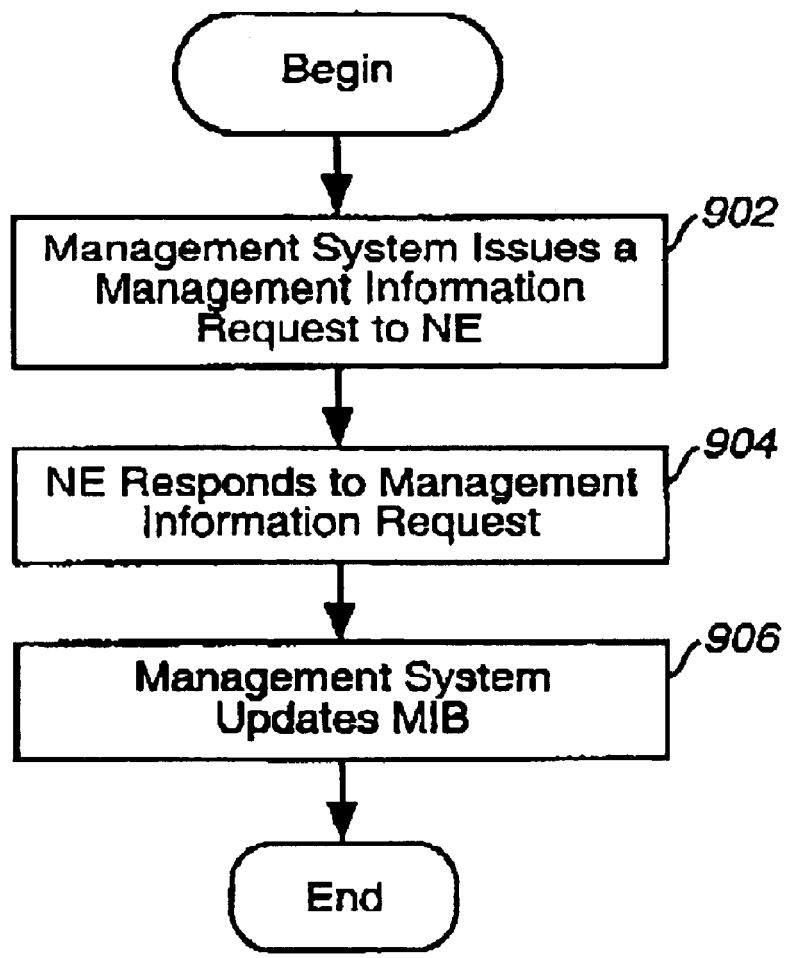

In the description of the flowchart of FIG. 8, the updates of the MIB are based upon the sending of management information notification messages by the NE. These messages were sent based upon the NE's internal determination. As illustrated in the flowchart of FIG. 9, the NE can also respond to requests by the network management system.

The network management system can send requests to the NE as part of a periodic auditing process. This auditing process ensures that the network management system has received all management information notification messages that have been transmitted by the NEs. This auditing process is useful where the NE does not have the capability to store and resend management information notification messages upon unacknowledged receipt, This process illustrated in FIG. 9 begins at step 902 where the management system issues a management information request to the NE. This management information request specifies the information or object(s) of interest. In one embodiment the management information request is sent to the agent within the NE. In other embodiments, the management information request is sent directly to an object within the NE.

Upon receipt of this management information request, the NE responds, at step 904, to the management information request by sending a management information notification message to the network management system. The network management system thereafter updates the MIB at step 906.

It should be noted that objects are not necessarily required in implementing the present invention. Rather, an object can be replaced with a generic entity that includes a unit of information. This entity is used to represent a portion or aspect of a managed network resource. The interrelationship between the entities will mirror those of the objects described above. In this generic scenario, the entities can be brought into a single software application, thereby reducing to some extent their autonomy. In comparison, objects exist effectively as independent applications. The general advantages of an object are that the code and the data records will be in one place and associated very tightly. This increases the relative granularity of objects as compared to a generic software entity.

Figure 1:
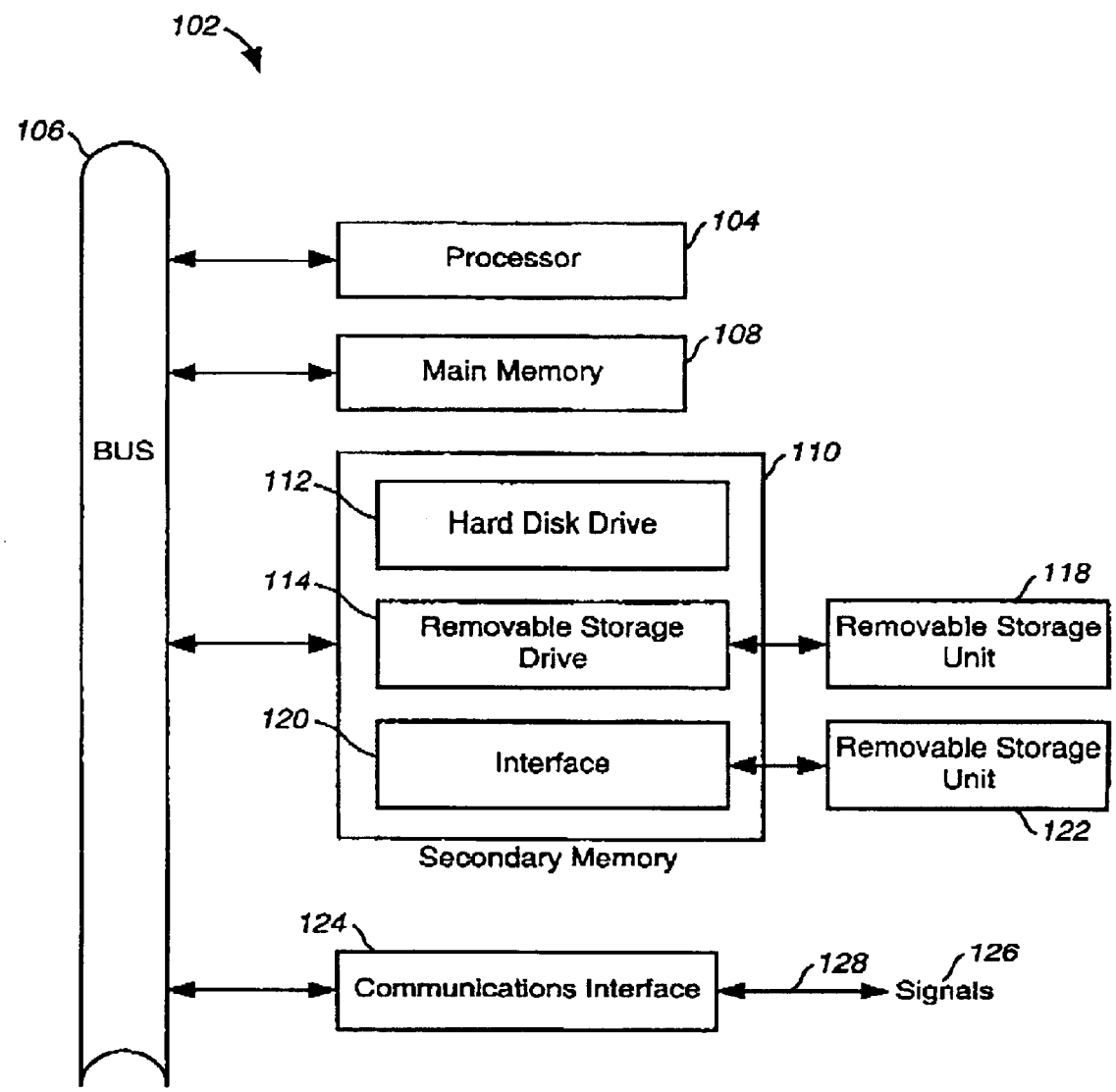
FIG. 1 illustrates a block diagram of a computer useful for implementing elements of the present invention.

The present invention may be implemented using hardware, software or a combination thereof and may be implemented in a computer system or other processing system (e.g., NE). In fact, in one embodiment, the invention is directed toward a computer system capable of carrying out the functionality described herein. An example computer system 102 is shown in FIG. 1. The computer system 102 includes one or more processors, such as processor 104. The processor 104 is connected to a communication bus 106. Various software embodiments are described in terms of this example computer system. After reading this description, it will become apparent to a person skilled in the relevant art how to implement the invention using other computer systems and/or computer architectures.

Computer system 102 also includes a main memory 108, preferably random access memory (RAM), and can also include a secondary memory 110. The secondary memory 110 can include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 102. Such means can include, for example, a removable storage unit 122 and an interface 120. Examples of such can include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 118 to computer system 102.

Computer system 102 can also include a communications interface 124. Communications interface 124 allows software and data to be transferred between computer system 102 and external devices. Examples of communications interface 124 can include a modem, a network interface (such as an Ethernet card), a communications port, a PCM-CIA slot and card, etc. Software and data transferred via communications interface 124 are in the form of signals which can be electronic, electromagnetic, optical or other signals capable of being received by communications interface 124. These signals 126 are provided to communications interface 124 via a channel 128. This channel 128 carries signals 126 and can be implemented using wire or cable, fiber optics, a phone line, a cellular phone link, an RF link and other communications channels.

In this document, the terms "computer program medium" and "computer usable medium" are used to generally refer to media such as removable storage device 118, a hard disk installed in hard disk drive 112, and signals 126. These computer program products are means for providing software to computer system 102.

Computer programs (also called computer control logic) are stored in main memory and/or secondary memory 110. Computer programs can also be received via communications interface 124. Such computer programs, when executed, enable the computer system 102 to perform the features of the present invention as discussed herein. In particular, the computer programs, when executed, enable the processor 104 to perform the features of the present invention. Accordingly, such computer programs represent controllers of the computer system 102.

In an embodiment where the invention is implemented using software, the software may be stored in a computer program product and loaded into computer system 102 using removable storage drive 114, hard drive 112 or communications interface 124. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. A method of establishing and maintaining a management information database, comprising:

(1) determining whether a change has occurred to a network resource within a network element;

(2) determining whether said change to said network resource satisfies at least one subscription criteria, the subscription criteria including at least one of a permanent change indication or a temporary change indication; and (3) sending an event driven management information notification to said network management system if said change to said network resource satisfies the at least one subscription criteria.

2. The method of claim 1, wherein said step (3) comprises the step of sending a management information notification to said network management system from an object that is instantiated within said network element.

3. The method of claim 1, wherein said step (1) comprises the step of sending a management information notification to said network management system from an agent in said network element.

4. A system for establishing and maintaining a management information database, comprising:

means for determining whether a change has occurred to a network resource within a network element;

means for determining whether said change to said network resource satisfies at least one subscription criteria, the subscription criteria including at least one of a permanent change indication or a temporary change indication; and means for sending an event driven management information notification to said network management system if said change to said network resource satisfies the at least one subscription criteria.

5. The system of claim 4, wherein said management information notification is sent to said network management system from an object that is instantiated within said network element.

6. The system of claim 4, wherein said management information notification is sent to said network management system from an agent in said network element.

7. A system for managing a network, comprising:

one or more network elements, each network element configured to:
  identify a relationship between hardware in the network element,
  determine at least one signal flow relationship,
  determine an object hierarchy representing a configuration of the network element based on the hardware relationship and the at least one signal flow relationship, and
  transmit the object hierarchy; and a network management device configured to:
  receive the object hierarchy from each of the network elements,
  store the object hierarchy in a database, and
  manage the network elements using the received object hierarchies.

8. A method for managing a network having a plurality of network elements and a network management device, comprising:

identifying, by each of the network elements, a relationship between hardware in the network element;

determining, by each of the network elements, at least one signal flow relationship;

determining, by each of the network elements, an object hierarchy representing a configuration of a respective network element based on the hardware relationship and the at least one signal flow relationship;

transmitting the object hierarchy to the network management device;

storing each object hierarchy in a database; and managing the network elements using the object hierarchies.

* * * * *